May 13, 1941.  G. BARTH  2,241,499
EARTH INDUCTOR COMPASS
Filed June 6, 1939
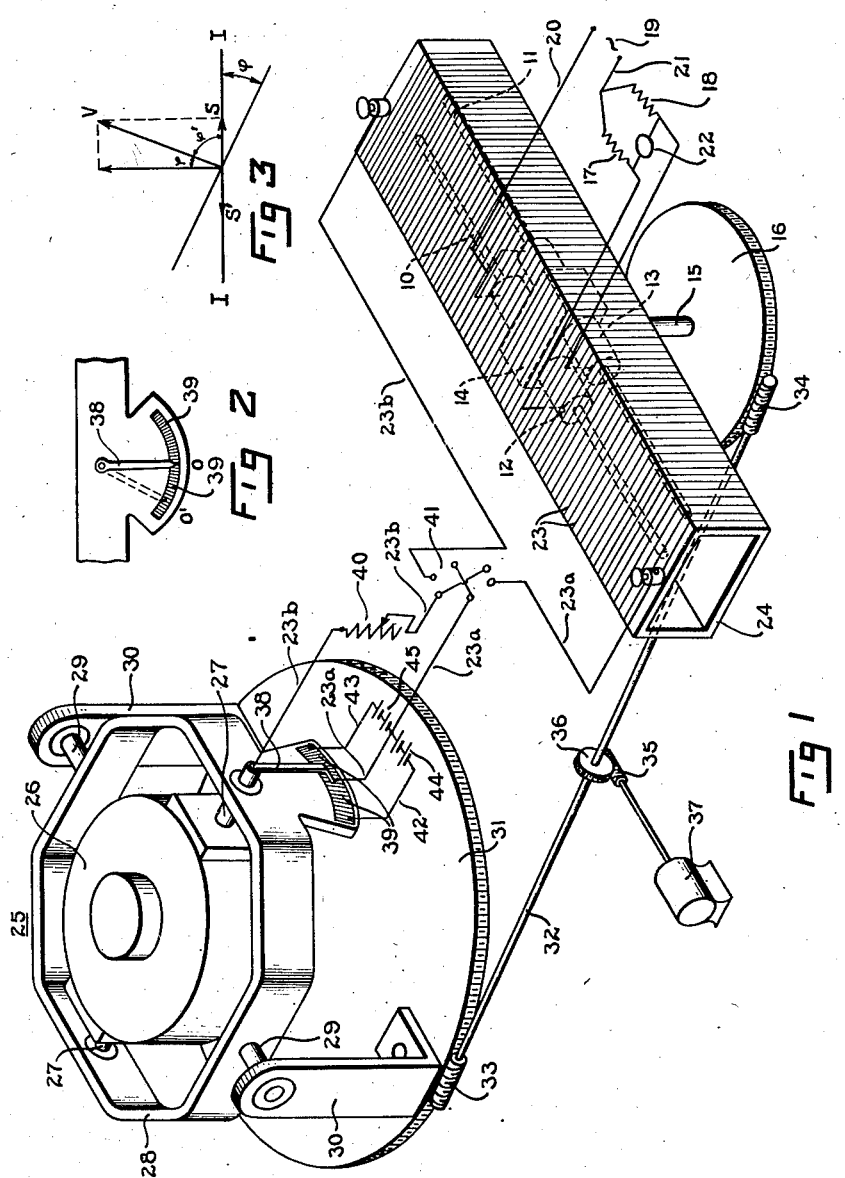
INVENTOR.
Gustav Barth
BY
Stephen Cerstvik
ATTORNEY.

Patented May 13, 1941

2,241,499

UNITED STATES PATENT OFFICE 2,241,499

EARTH INDUCTOR COMPASS

Gustav Barth, Berlin, Germany, assignor to Siemens Apparate und Maschinen Gesellschaft mit beschränkter Haftung, Berlin, Germany, a corporation of Germany Application June 6, 1939, Serial No. 277,710
In Germany June 21, 1938

8 Claims. (Cl. 33—204)

This invention relates to direction indicating means and more particularly to apparatus for indicating the position of an object relative to a magnetic field, for example, the terrestrial magnetic field.

One of the objects of the present invention is to provide novel apparatus of the above character, wherein means are provided for fully compensating for error-inducing components of a magnetic field acting thereon.

Another object of the invention is to provide novel direction indicating means which maintain a high accuracy regardless of the attitude of the means.

A further object is to provide a novel compass which is not subject to disturbing acceleration forces which occur in vehicles, for example, such as aircraft.

An additional object is to provide a novel compass, especially adapted for use aboard aircraft, which need not be mounted in gimbal rings and which is always clearly visible to a pilot of the craft regardless of the attitude of said craft.

A still further object is to provide a novel compass for use abroad vehicles such as aircraft, the compass having a direction determining element which is adapted for movement preferably about one axis which is parallel to the vertical axis of the craft.

Another object is to provide a novel device of the above character for determining a direction indication by measuring a horizontal component of the terrestrial field and for compensating for the effect of a vertical component of said field upon the device.

The above and further objects and novel features will more fully appear from the following detailed description when the same is read in connection with the accompanying drawing. It is to be expressly understood, however, that the drawing is for purposes of illustration only and is not intended as a definition of the limits of the invention, reference for this latter purpose being had to the appended claims.

In the drawing, wherein like reference characters refer to like parts throughout the several views—

Fig. 1 is a perspective view of one embodiment of the invention;

Fig. 2 is a detailed view of a resistance employed in the invention; and,

Fig. 3 is a vector representation of certain forces which influence the operation of the apparatus.

The present apparatus includes a direction indicating means which does not employ the directive force of a magnetic field such as the terrestrial field in order to produce direction indications, but which rather measures a component of the field, the strength of the component being a function of the angular disposition of the measuring means relative to the magnetic meridian. The measuring means in apparatus of this kind comprises, for example, one or a plurality of rod members of high magnetic permeability, each having a winding thereon, the latter being connected in a suitable measuring circuit. Such rods and windings are illustrated and described in the pending U. S. application Serial No. 196,089, filed March 15, 1938.

Ordinarily when compasses are employed for navigation and control purposes in vehicles, especially in aircraft, it is necessary to suspend the instruments in gimbal rings. By means of the latter, the compass can freely oscillate and pivot, since it is suspended in the manner of a pendulum. However, distributing acceleration forces act upon compasses mounted in this manner and prevent the accurate operation thereof.

In connection with the present invention, the compass is not mounted in gimbal rings but rather is firmly connected to a vehicle in such a manner that it is rotatable about at least one axis, preferably an axis which is parallel to the vertical axis of the vehicle, the rotation occurring in a plane perpendicular to said axis. Therefore, contrary to the magnetic needle compass which is ordinarily suspended in gimbal rings, every possibility of oscillating or pivoting has been eliminated in the present compass which is firmly mounted upon the vehicle whereby it participates in the changes in attitude thereof.

Inclinations of the aircraft upon which the present compass is mounted have a disturbing effect upon the direction indications thereof. This is because indications of the compass are normally based upon a measurement of a horizontal component of the earth's field, and inclinations of the craft will permit a vertical component of said field to act also, thereby preventing a correct indication. The vertical component of the terrestrial field may be considered as the resultant of two other components, one of which acts along the axis of the above-mentioned rod of the measuring means when inclined from the horizontal, the other of which acts perpendicular thereto. The component which is effective detrimentally to influence the direction indication is the one acting along said axis, it being known as the "disturbing component."

The latter superimposes itself upon the earth's horizontal component and thereby causes an incorrect direction measurement. The magnitude of the "disturbing component" depends upon the intensity of the vertical component and upon the angular disposition of the measuring rod and the winding relative thereto.

As above mentioned in accordance with the present invention the compass which is firmly mounted upon an aircraft, in a manner to appear later, is provided with means for compensating for the disturbing influence of the vertical components of the terrestrial field. The compensating action of the present novel apparatus is a function of the deviation of the craft from a normal position, i. e. one where no disturbing influence occurs with respect to the terrestrial magnetic field. Therefore, there is here employed, in combination with a suitable magnetic rod and winding arrangement, a separate coil which provides a compensating field of a controllable intensity and a predetermined direction, depending upon the aforesaid deviations of the craft.

In the form shown in Fig. 1, the apparatus for measuring the horizontal component of the terrestrial field comprises parallel rod shaped members 10 and 11 of highly permeable material, said members being of considerable length relative to the diameters thereof. Surrounding a central portion of each of these members are coils 12 and 13, respectively. The two rod members, with the coils thereon, are supported by a member 14 of non-magnetic material. Member 14 in turn is rigidly connected to a rotatable shaft 15 which is secured to a worm gear 16. The shaft 15 is in the form illustrated parallel to the vertical axis of the craft upon which it is mounted. Consequently, the rods 10 and 11 lie in a plane parallel to that of gear 16 and are angularly shiftable therewith in a plane parallel to a plane determined by the longitudinal and transverse axes of the craft. The rods 10 and 11 with the surrounding coils, however, may be situated in two separate planes, both of which are parallel to gear 16.

The coils 12 and 13 comprise, in this embodiment, two arms of a bridge circuit, the other two arms of which are constituted by ohmic resistances 17 and 18. The bridge circuit is connected to a source of periodically varying electric energy 19 by leads 20, 21. A galvanometer 22 is inserted in this circuit in a conventional manner.

The periodically variable current in windings 12 and 13 creates in the rods 10 and 11 a periodically variable magnetic flux. Assume that the plane is horizontal in which lie the axes of rods 10 and 11. Now, if an arrangement consisting of a horizontal rod and winding is subjected to the terrestrial field, only the horizontal component of said field will become effective in the rod. The constant magnetic flux of the terrestrial field superimposes itself upon the periodically variable flux existing in the winding or coil. The resistance to the periodically variable current of the circuit including said coil depends upon the variation of the magnetic resistance of the rod, while the terrestrial component is acting thereon. Consequently a bridge connection having such coils as arms, as here described, will provide readings which will be direct indications of the position of the coils relative to the magnetic meridian.

During horizontal flight when the plane of the aircraft, determined by the longitudinal and transverse axes thereof, is horizontal, only the horizontal component of the earth's field acts upon the direction indicating means, and no errors are introduced by a vertical component of said field. If, however, the equilibrium of the craft is disturbed, for example, by an external force such as wind gusts or due to a source within the craft such as a redistribution of loads or a dropping of a load, the attitude of the craft will change relative to the horizontal plane. Therefore the plane of rods 10, 11 will change and become angularly disposed relative to the horizontal, thus allowing a vertical component of the terrestrial field to be superimposed upon the component of the horizontal field.

In order to obtain a correct indication of the direction of magnetic north without error caused by the above vertical terrestrial component, means are provided for compensating for the vertical component comprising in the form shown a field coil 23 wound upon a drum 24, which surrounds both coils 10 and 11 and is supported midway between the extremities thereof by the shaft 15. Drum 24 is shown in the drawing as having a rectangular cross-section; however, any suitable cross-section may be employed. Leads 23a, 23b of coil 23 are connected in a manner to appear later to a source of direct current which, acting in the coil, produces a field which is substantially co-axial with that of coils 12 and 13.

Means are provided for controlling the strength of the compensating field in accordance with the intensity of the vertical terrestrial component by governing said field current as a function of the angular departure of the craft from the horizontal. The means, in the form shown, comprise a gyro 25 having a perpendicular axis of rotation. Such a gyro is commonly referred to as a gyro vertical. The rotor of the gyro is mounted in a housing 26 having trunnions 27 which rest in a gimbal frame 28, the latter having trunnions 29 which are supported in suitable bearings upon shoulders 30. The latter in turn, for a purpose to be later explained, are mounted upon a rotatable platform, for example, a worm gear 31, which ordinarily is stationary but which is angularly shiftable about an axis which is parallel to the vertical axis of the craft.

In order that the field intensity governing means for coil 23 may correctly compensate for departures of the craft and also the rods 10 and 11 from the horizontal, it is necessary that the gyro mounting be so disposed relative to the rods that the trunnions 29 are always parallel to said rods. Means for maintaining this relation comprise, for example, means driven by a common motor for adjusting the positions of the two units in azimuth. The means comprise a common shaft 32 having worms 33, 34 thereon which engage worm gears 31 and 16, respectively. The shaft is driven through a worm and wheel 35, 36 by a suitable motor 37 which may be controlled by a manually operable switch (not shown).

Suitable means for controlling the intensity of the field of coil 23 are provided which are constituted by a contact arm 38. The latter is operatively connected to one of the trunnions 27 and cooperates with a potentiometer resistance 39 attached to the gimbal frame 28. Arm 38 is connected through a variable resistor 40, to be later explained, to a reversing switch 41 by means of lead 23b. The resistance 39 is electrically connected to coil 23 through the above arm 38 and by means of lead 23a which is centrally attached thereto. The extremities of resistance 39 are connected to lead 23a by leads 42, 43 through suitable direct current sources, for example, batteries 44, 45, respectively.

In operation, during horizontal flight, a point 0 (Fig. 2), at which the arm 38 contacts potentiometer 39, coincides with the zero point of the potentiometer. If the craft angularly departs from a horizontal position, i. e., if the vertical axis of the plane moves away from the true vertical, then the axes of the rods 10, 11, represented as I, I in Fig. 3, will form an angle $\phi'$ with the perpendicular or the vertical component V. The angle $\phi$, which is the supplement of $\phi'$ is equal to the angle of the arc 0—0' (Fig. 2). 0' indicates the position of arm 38 relative to the central zero point 0 when the craft is at an angle $\phi$ with the horizontal. As explained above, the disturbing portion of the vertical component V superimposes itself upon the horizontal component of the terrestrial field which acts upon coils 12, 13. This disturbing component is shown as a vector S (Fig. 3) and equals V sin $\phi$. In order to compensate for this component, there is produced in coil 23 a magnetic field of equal and opposite strength S'. The compensating field is proportional to the current flowing in the coil and should be a function of sin $\phi$. This current flows in response to the sin $\phi$ by way of resistance 39 from batteries 44 or 45. Since the compensating coil current must be proportional to said sin $\phi$, the potentiometer resistance 39 is so constructed that the voltage at any point thereof is a function of the sine of the angle measured to the central point 0.

By some means of the adjustable resistor 40, the limits of the current from sources 44, 45 can be controlled and adjusted as a function of the latitude and longitude of the aircraft, such an adjustment being necessary because of variations in intensity of the terrestrial vertical component which exist at different locations on the earth. The adaptation of the compensating field to the disturbing component, however, can be accomplished in a different manner; for example, by selecting power sources of varying voltages, or by connecting a resistance in parallel to the field winding 23, or by changing the number of turns of the field winding, or any other suitable manner.

Inasmuch as the vertical terrestrial component is compensated for in the above manner, the unidirectional flux of the horizontal terrestrial component is effective to alter the permeability of rods 10, 11. The amount of alternating current passing through the windings 12, 13 upon said rods is a function of the permeability of the latter. The permeability is a function of the angular disposition of the rods relative to the magnetic meridian; consequently, the alternating current, as indicated by galvanometer 22 of the above described bridge circuit, is also a function of said angular disposition.

In order that the apparatus may be adapted for operation in both northern and southern latitudes, the double throw switch 41 is provided, as above mentioned.

If in the course of a flight during which an inclined position may have to be maintained for some period of time, as above mentioned, unintentional changes of position, caused, for example, by wind gusts, may occur. The effect of these changes upon the present compass, i. e. of moving it away from a true horizontal, are compensated for by the above described apparatus. Therefore a rough mechanical position correction is applied to the compass for intentional inclinations of the craft and fine corrections are applied electrically for unintentional inclinations of the craft.

There is thus provided a novel device for eliminating the effects of the terrestrial vertical component upon a direction indicating means of the above character. The device is not subject to external electrical disturbances, is positive and automatic in action. The apparatus is simple in construction, inexpensive to manufacture, and provides direction indications of a high accuracy.

Although only one embodiment has been illustrated and described in detail, it is to be expressly understood that the invention is not limited thereto. Various changes may also be made in the design and arrangement of the parts without departing from the spirit and scope of the invention as the same will now be understood by those skilled in the art. For a definition of the limits of the invention, reference will be had primarily to the appended claims.

What is claimed is:

1. In a direction indicating device having coils surrounding cores of magnetically permeable material mounted upon a fixed axis relative to a craft for movement with said craft during inclinations thereof, a power supply connected with said coils for causing a periodically varying current to flow in said coils, and means for measuring changes in current flowing in said coils when the latter are angularly displaced relative to an inclined uni-directional magnetic field as a measure of said displacement, the combination with said coils of means surrounding said coils for producing a compensating magnetic field adjacent thereto, means for maintaining a reference plane angularly fixed relative to the earth, and means actuated by relative movement of said maintaining means and said craft for controlling the strength of the compensating field as a function of the angular departure of said coils from said reference plane.

2. In combination, a core member of magnetically permeable material, a coil wound on said core member, said coil and core member being rotatably mounted about a normally vertical axis fixed relatively to a craft, means connecting said coil to a source of periodically varying current, means for measuring changes in current flow in said coil when said coil and core member are angularly displaced from a predetermined position about said vertical axis as a function of said displacement, a compensating field coil surrounding said coil and core member, a source of current for said compensating coil, means for maintaining a reference plane angularly fixed relative to the earth for said coil and core member in which position no current flows in said compensating coil, and means connected with said last-named current source and said compensating coil and controlled by said reference maintaining means during relative movement thereof and said coil and core member to cause current flow in said compensating field coil, thereby controlling the strength of the magnetic field surrounding said field coil as a function of the angular departure of said coil and core member from said reference plane.

3. In a direction indicating device for an aircraft, a compass including a direction responsive element, an indicating device operatively connected to said element for producing directional indications as a function of the disposition of said element relative to the earth's magnetic field, said element being mounted on said craft for angular movement with said craft during inclinations thereof and for rotation about a fixed axis parallel to the normal axis of said craft, a compensating coil mounted upon and surrounding said compass for producing a magnetic field to thread said element, means mounted upon said craft for establishing a substantially horizontal reference plane angularly fixed relatively to the earth, a source of current for said compensating coil, and means connected with said last-named source of current and said compensating coil and controlled by said reference means governing the strength of the field set up by said compensating coil as a function of the relative angular displacement of said reference means and said craft.

4. In a direction indicating device for an aircraft, direction responsive means mounted on said craft for angular movement with said craft during inclinations thereof and for rotation about a normally vertical axis fixed relatively to the craft, means responsive to the angular disposition of said direction responsive means relative to the earth's magnetic field for producing directional indications, a magnetic field generator surrounding said direction responsive means, means for maintaining a substantially horizontal reference plane angularly fixed relatively to the earth, a source of current for said generator, means connecting said source of current and said generator and controlled by said reference maintaining means for governing current flow to said generator whereby the intensity of the field produced by said generator is a function of the relative angular movement of said reference maintaining means and said craft.

5. In a direction indicating device for an aircraft, direction indicating means including a pair of core elements of permeable magnetic material mounted in parallel, a coil inductively related with each of said cores respectively, a source of current for said coils, said cores and said coils being rotatably mounted about a normally vertical axis fixed relatively to the craft, a magnetic field generator surrounding said core and coil elements, a direct current source for said generator, means mounted on said craft for maintaining a substantially horizontal reference plane angularly fixed relatively to the earth, and a two-part potentiometer device connecting said direct current source and said magnetic generator and controlled by said reference maintaining means governing current flow from said direct current source to said generator during relative movement of said reference maintaining means and craft, one part of said potentiometer being moved by the means for maintaining the reference plane.

6. In a direction indicating device for an aircraft, direction indicating means mounted for rotation about an axis fixed relatively to the craft and for angular movement with said craft relative to the earth's magnetic field during inclinations of said craft, magnetic field producing means mounted adjacent to and surrounding said direction indicating means, means mounted on said craft for maintaining a substantially horizontal reference plane angularly fixed relatively to the earth, a source of direct current for said magnetic field producing means, and a potentiometer device connecting said direct current source to said magnetic field producing means, said potentiometer device having a portion thereof secured to said reference maintaining means for varying the resistance of said potentiometer to the flow of current from said direct current source to said magnetic field producing means as a function of the angle by which the craft tilts from said reference plane.

7. In a direction indicating device for an aircraft, direction indicating means rotatably mounted about an axis fixed relatively to the craft, compensating magnetic field producing means mounted about said direction indicating means, a gyro having a vertical spin axis mounted in a gimbal ring and adapted for maintaining a substantially horizontal reference plane angularly fixed relatively to the earth, a rotatable platform mounted on a fixed axis relative to said craft for supporting the gimbal ring, means for operatively connecting said platform and said indicating means whereby one of the axes of said indicating means is maintained parallel to the axis of said gimbal ring, and means having one portion thereof secured with said gimbal ring and another portion thereof movable with said gyro during relative movement of said gyro and said craft for controlling the intensity of the field of said field producing means in response to inclinations of said craft relative to said reference plane.

8. In a direction indicating device for an aircraft, direction indicating means mounted for rotation about an axis fixed relatively to the craft, said direction indicating means being subjected to disturbing vertical terrestrial magnetic components during craft inclination, magnetic field producing means surrounding said direction indicating means for compensating for the effect of the vertical terrestrial magnetic components upon the direction indicating means during craft inclination, means mounted on said craft for maintaining a substantially horizontal reference plane angularly fixed relatively to the earth, a source of direct current for said mgnetic field producing means, and a potentiometer device electrically connecting said direct current source to said magnetic field producing means, said potentiometer device having a portion thereof secured to said reference maintaining means for varying the resistance of said potentiometer to the flow of current from said direct current source to said magnetic field producing means as a function of the angle by which the craft tilts from said reference plane.

GUSTAV BARTH.